United States Patent
Hashimoto et al.

[11] Patent Number: 5,968,994
[45] Date of Patent: Oct. 19, 1999

[54] HIGH STRENGTH POROUS FILM OF POLYPROPYLENE AND PROCESS FOR PRODUCING SAME

[75] Inventors: Akinao Hashimoto; Kazuo Yagi; Hitoshi Mantoku, all of Kuga-gun, Japan

[73] Assignee: Mitsui Chemicals, Inc., Tokyo, Japan

[21] Appl. No.: 08/837,726

[22] Filed: Apr. 22, 1997

[30] Foreign Application Priority Data

Apr. 26, 1996  [JP]  Japan ..................................... 8-108227
Jan. 16, 1997  [JP]  Japan ..................................... 9-005389

[51] Int. Cl.$^6$ .................................................. B29C 49/08
[52] U.S. Cl. .............. 521/143; 210/500.27; 210/500.36; 210/500.42; 264/41; 264/210.3; 264/210.4; 264/210.5; 264/210.7; 264/211; 264/211.13; 264/211.2; 428/315.5; 521/64
[58] Field of Search ........................ 521/64, 143; 264/41, 264/210.3, 210.4, 210.5, 210.7, 211, 211.13, 211.2; 210/500.27, 500.36, 500.42; 428/315.5

[56] References Cited

U.S. PATENT DOCUMENTS

| | | |
|---|---|---|
| 3,839,516 | 10/1974 | Williams et al. . |
| 3,903,234 | 9/1975 | Ikeda et al. . |
| 4,257,997 | 3/1981 | Soehngen et al. . |
| 4,620,956 | 11/1986 | Hamer . |
| 4,791,144 | 12/1988 | Nagou et al. . |
| 5,015,521 | 5/1991 | Fuji et al. ................................ 521/143 |
| 5,134,174 | 7/1992 | Xu et al. ................................. 521/143 |
| 5,238,618 | 8/1993 | Kinzer . |
| 5,650,451 | 7/1997 | Yagi et al. ............................... 521/143 |
| 5,759,678 | 6/1998 | Fujii et al. ............................... 521/143 |

FOREIGN PATENT DOCUMENTS 2251205  7/1992  United Kingdom .
WO90/11321  10/1990  WIPO .

OTHER PUBLICATIONS

Zhu, et al., "A Novel Polypropylene Microporous Film", Polymers For Advanced Technologies, vol. 7, pp. 743–748 (1996).

Primary Examiner—John M. Cooney, Jr.
Attorney, Agent, or Firm—Sherman and Shalloway

[57] ABSTRACT

A process for producing a porous film of polypropylene comprises subjecting (1) an air-impermeable biaxially stretched film of polypropylene resin comprised predominantly of polypropylene having a crystallinity of at least 40% or (2) an air-impermeable inflation film of polypropylene resin comprised predominantly of polypropylene having a crystallinity of at least 46.5%, in the substantial absence of a plasticizer or a solvent, to a thermal treatment in the presence of a first liquid substantially incapable of dissolving the film while fixing the film in two orthogonal directions for making the film porous.

6 Claims, 1 Drawing Sheet

HIGH STRENGTH POROUS FILM OF POLYPROPYLENE AND PROCESS FOR PRODUCING SAME

FIELD OF THE INVENTION

The present invention relates to a high strength porous film of polypropylene and a process for producing same. More particularly, the present invention relates to a porous film of polypropylene excellent in moisture permeability and tensile strength which has been obtained by preparing a non-porous film of polypropylene without substantially adding a plasticizer or a solvent to the starting polypropylene and subjecting the film to a thermal treatment and/or stretching for enhancing crystallinity as well as a process for producing same.

The polypropylene film of the present invention is characterized by possessing the following physical properties:

(1) a tensile strength of at least 35 MPa in machine direction (MD) and transverse direction (TD);

(2) a porosity of not more than 80%; and (3) a moisture permeability of at least 20 $g/m^2$ day and has been made porous by stretching and/or thermally treating an air-impermeable and biaxially stretched polypropylene film which has been obtained without using a plasticizer or a solvent.

Mentioned as a means for making a film porous is a method wherein a biaxially stretched film or an inflation film of polypropylene is uniaxially or biaxially stretched for making it porous, a method wherein the above uniaxially stretching is carried out in the presence of a first liquid substantially incapable of dissolving a polypropylene film, or a method wherein the above thermal treatment or stretching treatment of the polypropylene film is carried out in the first liquid substantially incapable of dissolving polypropylene and thereafter the film is dipped into a second liquid compatible with the first liquid and lower in boiling point than the first liquid but inferior in affinity to polypropylene and is then dried up.

BACKGROUND OF THE INVENTION

From the past, a number of the methods for shaping porous polypropylene have been proposed.

A general method for making a film involves an inflation film shaping method and a T-die sheet shaping method. In case a polyolefin is to be made porous according to such a method, a method wherein the polyolefin is impregnated with an incompatible organic or inorganic matter and then the surface between the polyolefin and the incompatible matter is destroyed by external force such as stretching or a method wherein a component incompatible with polyolefin is treated with an organic solvent, an acid or an alkali capable of dissolving the component is said to be general. Thus, it is rather rare that a single component polyolefin sheet obtained from a film-shaping apparatus is directly employed as an original film for preparing a porous film.

As an example of a porous film prepared from a single component film, there is mentioned a film prepared from an extrusion cold stretching method as disclosed in the Official gazette of Japanese Laid-open Patent Appln. No. Sho. 62-121737.

The cold stretching in this case is in principle uniaxial and therefore a balance in tensile strength of the film is extremely poor so that the tensile strength of the film in the direction perpendicular to the machine direction is as small as 20 MPa or less, thus limiting its industrial use limitative.

With a view to improving the strength in the direction perpendicular to the machine direction in this invention, Japanese Laid-open Patent Appln. No. Sho. 55-161830 discloses a solvent-stretching method for a microporous film.

This method enables stretching the film in transverse direction up to about 300% after stretching it in the machine direction so that a balance of the tensile strengths seems to be improved. However, tensile strengths themselves are extremely poor so that the strength of the stretched film is almost equal to unstretched film or is lower than the latter and at most as high as 30 MPa.

A high molecular weight polyolefin possesses excellent properties such as impact-resisting property, anti-abrasive property, chemicals-resisting properties and the like, as compared with a widely used polyolefin, and is now being studied for shaping it into films or sheets.

As the high molecular weight polyolefin is extremely higher in melt viscosity than the widely used polyolefin, however, the former cannot be shaped into films or sheets by the aid of an ordinary extruder unlike the widely used polyolefin.

In case a film or sheet excellent in tensile strength is to be obtained from the high molecular weight polyolefin, ordinarily the high molecular weight polyolefin is impregnated with a solvent or a plasticizer compatible therewith to decrease its melt viscosity before being shaped into a film or sheet by the aid of a conventional extruder and is then stretched or further treated for eliminating the solvent or plasticizer.

The solvent method and the plasticizer method employ a large amount of a solvent or plasticizer compatible with the high molecular weight polyolefin and a much larger amount of another solvent compatible with the above solvent or plasticizer for removing the first solvent or plasticizer to make the resultant film porous.

SUMMARY OF THE INVENTION

In recent years, the demand for porous films of polyolefin has increased. In the use for a filtering material, for example, the porous film is being watched in the field of food industry in view of its acid-resisting and alkali-resisting properties and hygiene. As a separator for secondary batteries to which public attention is recently paid, use of the porous film may be expected because of its chemical stability and safety. There are, however, a number of problems for meeting these expectations. In the foregoing extrusion and cold stretching method, a porous film having satisfactory mechanical strength cannot be obtained. In the art wherein the high molecular weight polyolefin is used, a great cost is technically or economically needed for coping with the environmental factors of gienics on production, safety and hygiene and the mental load of workers.

Accordingly, it is an object of the present invention to improve mechanical strength of a porous polypropylene film obtained according to an extrusion and cold stretching method by using a biaxially stretched film or an inflation film of polypropylene within an ordinary molecular weight region as an original film for producing a porous film and subjecting the original film to a thermal treatment and/or a stretching treatment under a specific condition.

It is another object of the present invention to provide a process for producing a porous film of polypropylene excellent in mechanical strength and free in porous film functions such as pore size, air-permeability and porosity wherein a polypropylene film of an ordinary molecular weight is used as starting material and subjected to a thermal treatment and/or a stretching treatment under a specific condition thereby eliminating inefficient steps encountered in an aspect of production in a prior art using a high molecular weight polyolefin and anxious steps from the viewpoint of environmental hygienics and safety.

DETAILED DESCRIPTION OF PREFERRED EMBODIMENTS OF THE INVENTION

Figure 1:
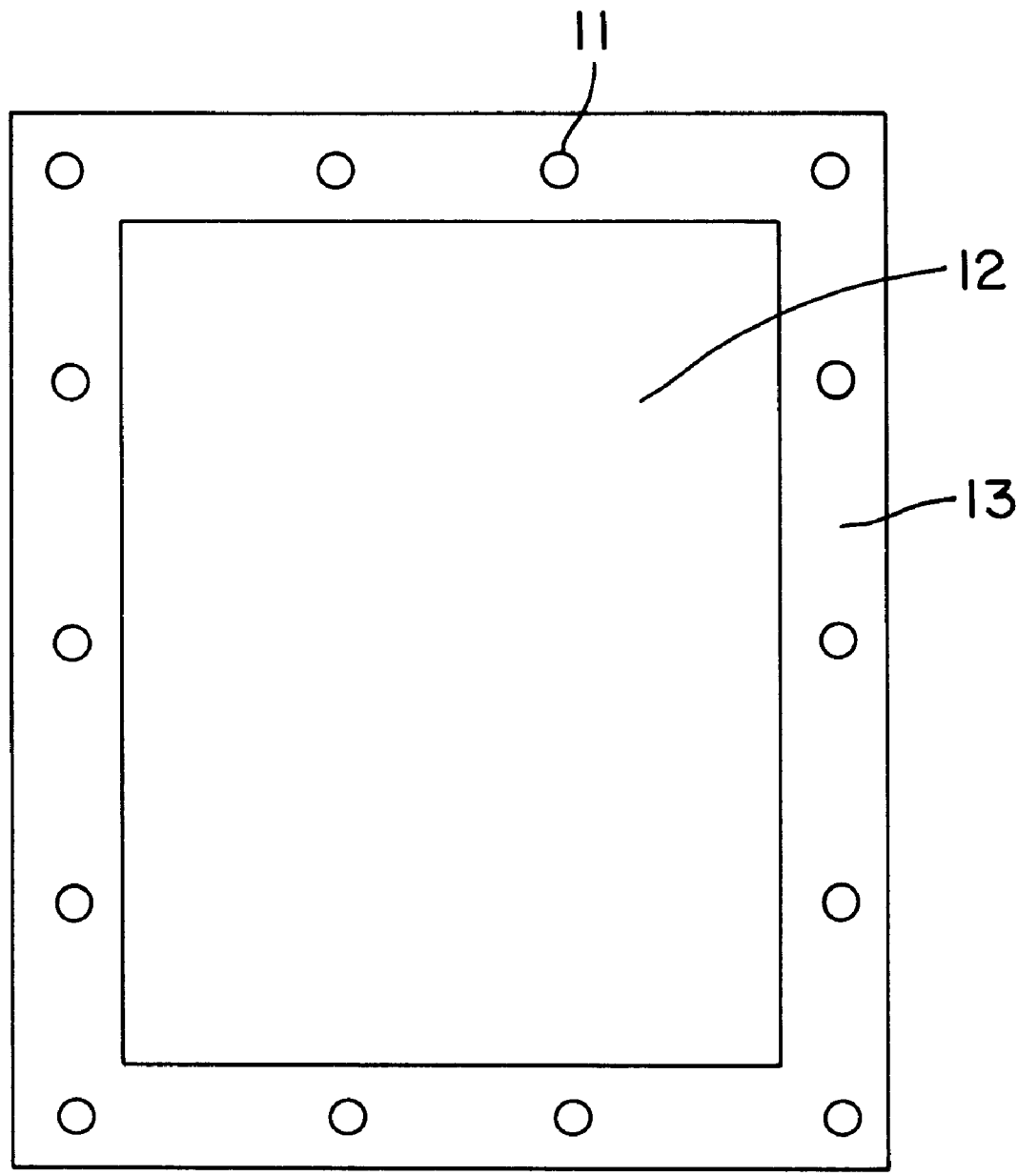
FIG. 1 shows a metal frame for fixing the circumference of a film on carrying out a thermal treatment of the film in Experimental Examples 2–11, wherein 11 stands for a screw, 12 for a film before treatment and 13 for the metal frame.

The present invention has been proposed to attain the above object and its important character resides in the point that polypropylene having an ordinary range of molecular weight is used as starting material and shaped into a biaxially stretched film or inflation film without substantial addition of a plasticizer or solvent and finally subjected to a special treatment. Noteworthy here is that no substantial addition of a plasticizer or solvent to the starting polypropylene means that the polypropylene does not contain any additive which may alter the physical properties of the polypropylene. It is to be noted however that this does not mean exclusion of a trace amount of an additive such as a stabilizer.

According to one aspect of the present invention, there is provided a porous film of polypropylene which comprises predominantly a polypropylene resin and possesses the following physical properties:

(1) a tensile strength of at least 35 MPa in machine direction (MD) and transverse direction (TD);

(2) a porosity of not more than 80%; and (3) a moisture permeability of at least 20 g/m$^2$ day.

According to the present invention, there is also provided the porous film of polypropylene wherein the polypropylene resin has an intrinsic viscosity [$\eta$] of not more than 4.

According to the present invention, there is further provided a porous film of polypropylene possessing the above physical properties, which has been obtained by subjecting an air-impermeable biaxially stretched film or inflation film of polypropylene to stretching and/or thermal treatment for making it porous, the air-impermeable film having been obtained without using substantially a plasticizer or solvent.

According to another aspect of the present invention, there is provided a process for producing a porous film of polypropylene which comprises stretching a biaxially stretched film or inflation film of polypropylene in uniaxial or biaxial direction for rendering the film porous.

According to the present invention, there is also provided a process for producing a porous film of polypropylene which comprises subjecting a biaxially stretched film or inflation film of polypropylene to a thermal treatment for increasing the crystallinity thereof to make the film porous.

According to the present invention, there is further provided a process for producing a porous film of polypropylene which comprises subjecting a biaxially stretched film or inflation film of polypropylene to a thermal treatment for increasing the crystallinity thereof and thereafter stretching the film in uniaxial direction for making the film porous.

According to the present invention, there is still further provided a process for producing the porous film of polypropylene, wherein the starting polypropylene resin has an intrinsic viscosity [$\eta$] of not more than 4.

According to the present invention, there is still further provided a process for producing the porous film of polypropylene, wherein the thermal treatment for increasing the crystallinity is carried out in the presence of a first liquid substantially incapable of dissolving the biaxially stretched film or inflation film of polypropylene.

According to the present invention, there is still further provided a process for producing the porous film of polypropylene, wherein the stretching of polypropylene in uniaxial or biaxial direction is carried out in the presence of a first liquid substantially incapable of dissolving the polypropylene film.

According to the present invention, there is still further provided a process for producing the porous film of polypropylene, wherein the first liquid is a hydrocarbon having a boiling point higher than the treating temperature during the thermal treatment or stretching for making the film porous.

According to the present invention, there is yet further provided a process for producing the porous film of polypropylene, wherein the thermal treatment or stretching treatment is carried out in the presence of the first liquid substantially incapable of dissolving polypropylene, the polypropylene film is then dipped into a second liquid which is compatible with the first liquid but lower in the boiling point than the first liquid and is inferior in affinity to polypropylene and thereafter the film is dried.

Below are the starting material, a method for preparing the original (precursor) film, a method for the thermal treatment, a method for the stretching and the characteristics of the resultant film with respect to the process for producing a porous film of polypropylene of the present invention.

(Starting Material)

Polypropylene used in the present invention is obtained by polymerizing propylene alone or together with one or more combination of α-olefins having carbon atoms of 4–8, for example, in slurry polymerization by the aid of a Ziegler catalyst or gas phase polymerization by the aid of a Metallocene catalyst.

The polypropylene is preferably a homopolymer of propylene and, in case of polypropylene copolymer, the amount of such copolymer is 5 mol % or less.

No limitation exists in the molecular weight of the polymer unless any trouble takes place at the time of shaping. In order to make shaping ability compatible with high strengthening, however, the intrinsic viscosity [$\eta$] is desirably at least 1 dl/g, preferably at least 2 dl/g but not more than 4 dl/g.

In case the intrinsic viscosity [$\eta$] is less than 1 dl/g, the operation for rendering the film porous may become difficult.

The polypropylene used in the present invention may be incorporated with various additives usually employed for polypropylene, such as a heat-resisting stabilizer, a weather-resisting stabilizer, a lubricant, an anti-blocking agent, a slipping agent, a pigment, etc., in an amount not damaging the object of the present invention.

(Original [Precursor] Film)

Among polypropylene films, those having an intrinsic viscosity [$\eta$] of at least 1 dl/g can be obtained according to an ordinary film-shaping method such as biaxially stretching method or inflation film-shaping method.

As the stretching method, any of the usually employed methods can be adopted, such as a sequential biaxially stretching method wherein an ordinarily used T-die sheet is, after shaping, stretched in a machine direction by a roll or the like and successively stretched in a transverse direction by a tenter, and a simultaneous biaxially stretching method wherein the sheet is biaxially stretched simultaneously by way of a tenter clip. The inflation film-shaping method can be carried out with the aid of a conventional shaping device by properly selecting an expansion ratio and a draft ratio (a ratio of a film take-up rate to a resin extrusion rate in the die).

A film thus obtained is a non-porous film having preferably an intrinsic viscosity [$\eta$] of at least 1 dl/g, more preferably at least 2 dl/g but not more than 4 dl/g, a tensile strength of at least 50 MPa in machine direction (MD), a tensile strength of at least 50 MPa in transverse direction (TD), and a moisture permeability coefficient of not more than 10 g·mm/m$^2$·day. No limitation exists in thickness of the resultant film so far as the resultant porous film satisfies the moisture permeability condition, but the thickness is preferably 1–100 μm, more preferably 10–50 μm for the convenience of handling in the subsequent stretching step.

Crystallinity of the film determined from the heat of crystal fusion measured by a differential scanning calorimeter (DSC) is at least 40%, preferably at least 45%. A film obtained according to the aforementioned shaping method and having a crystallinity of not more than 40% tends to depress its porosity and is thus not preferable when stretched to make porous.

(Method for Thermal Treatment)

A thermal treatment of the film obtained by the aforesaid shaping treatment can be carried out according to a treating method and conditions under which crystallinity of the treated film may exceed 50%, for example, within a temperature range from 100° C. to the melting or dissolving temperature of polypropylene and a period of time over 1 minute. In this case, unstretched film is preferably restrained or fixed at least in one direction, preferably orthogonal directions to prevent shrinkage.

It is a matter of course that further thermal treatment for the resultant film obtained in the above shaping treatment having a crystallinity of at least 40% with a view to enhancing crystallinity further is preferable for maintaining a high porosity when the film is made porous.

The thermal treatment of the film prior to stretching is carried out under restraint of the film, or in other words, by fixing the film at least in one direction, preferably orthogonal directions.

In case the inflation film is used as an original film, the pore diameter of the resultant porous film may be adjusted by its draft ratio. If the draft ratio is small, the pore diameter of the film tends to become larger. In contrast, if the draft ratio becomes larger, the pore diameter will become smaller.

In case the original film prior to the thermal treatment is fixed in two directions, selection of an optimum condition in the aforesaid treatment leads to omit the subsequent stretching treatment and the film will be made porous at that stage. When a specific solvent undermentioned is employed, the treated film can be allowed to dry under the fixing condition thereby obtaining a porous film.

Atmosphere for the thermal treatment may be open air, but the thermal treatment may be carried out in a first liquid substantially incapable of dissolving polypropylene. By the wording "substantially incapable of dissolving" is meant that at least a part of the polypropylene is swollen or dissolved at the treating temperature but is kept as a whole in the form of a film. Accordingly, a solvent capable of dissolving the whole polypropylene is excluded from the first liquid.

Namely, crystallinity of polypropylene can be increased when the prepared polypropylene precursor film is restrained at least in one direction and dipped in the first liquid which does not substantially dissolve polypropylene at the treatment temperature.

Illustrative of such first liquid are lower aliphatic alcohols such as ethanol, propanol, butyl alcohol and amyl alcohol; lower aliphatic ketone such as acetone, methyl ethyl ketone and cyclohexanone; lower aliphatic esters such as ethyl formate and butyl acetate; halogenated hydrocarbons such as carbon tetrachloride, trichloroethylene, perchoroethylene and chlorobenzene; hydrocarbons such as heptane, cycohexane, octane, decane and dodecane; nitrogen-containing organic compounds such as pyridine, formamide and dimethylformamide; and ethers such as methyl ether, ethyl ether and dioxane. Glycols such as monoethylene glycol, diethylene glycol and triethylene glycol as well as silicone oils generally utilizable as a warming heat medium are also preferable first liquid.

These liquids may be used as a mixture of two or more of them. Warm or hot water containing a surfactant is also effective as the first liquid but benzene, xylene and tetralin are not preferable for the reason that these solvents dissolve polypropylene at the treatment temperature. The first liquids preferable for polypropylene are n-decane and n-dodecane.

(Dipping into a Low Boiling Point Liquid and Drying)

The film subjected to the thermal treatment in the first liquid is then subjected to a drying treatment. According to the sort of liquid used for the treatment, the liquid may be evaporated by direct drying with warm or hot blast if the film is fixed in two directions to prevent shrinkage. In case of the first liquid which is relatively slow in drying speed, it is preferable that the treated film is dipped into a second liquid compatible with the first liquid and lower in boiling point than the first liquid but inferior in affinity to polypropylene and then dried up. On drying, the treated film is fixed preferably at least in one direction, more preferably in two directions.

Illustrative of the utilizable second liquid are low boiling point hydrocarbons such as hexane and heptane; chlorine-substituted low boiling point hydrocarbons such as methylene chloride; and chlorine and fluorine-substituted low boiling point hydrocarbons such as 1,2-dichloro-2,2,2-trifluoroethane, 1,1-dichloro-1-fluoroethane, 1,3-dichloro-1,1,2,2,3-pentafluoropropane and 2,2,3,3,3-pentafluoropropanol. Concerning the dipping temperature and the dipping time, a minimum temperature and shortest period of time are selected so long as substitution of the liquids is completely carried out below the thermal treatment temperature.

The dried porous film thus obtained may be subjected to a heat set treatment in order to remove wrinkles on the film, to adjust the porosity and the thickness of the film, and to minimize the surface abrasion coefficient of the film. As conditions for the heat set treatment, a temperature, a treating time and the like are suitably selected in a gaseous (air) atmosphere.

(Stretching Method)

Stretching is carried out at a temperature below the melting point of the precursor film. The lower limit of the stretching temperature is preferably 150° C.–168° C., more preferably 160° C.–168° C., although it depends on the sort of polypropylene and the melting point of the precursor film. A stretch ratio in this case is not definite and varies according to the precursor film but a higher stretch ratio is preferable in view of strength and permeability.

The stretching treatment may be carried out in atmosphere of air or under contact with the first liquid as described in the foregoing thermal treatment, which is substantially incapable of dissolving the film before stretching at a stretching treatment temperature.

A method for stretching the film may be any one of the uniaxial stretching wherein shrinkage in transverse direction (width loss) is minimized, the uniaxial stretching wherein shrinkage in transverse direction is prevented by way of tenter clips, the sequential or simultaneous biaxial stretching wherein a total tenter clip system is used as conducted in an ordinary biaxial stretching testing apparatus, the continuous and sequential biaxial stretching wherein a first stretching step is conducted by way of a pair of rolls and a second stretching step is then conducted by way of tenter clips in transverse direction, and the continuous and simultaneous biaxial stretching wherein a continuous tenter clip system is used.

After completion of the thermal treatment and/or the stretching, the film may be subjected to a thermal treatment under the condition of fixing the film ends in air with a view to preventing shrinkage or formation of wrinkles in the film.

(Porous Polypropylene Film)

The film produced according to the present invention is a porous film wherein microfibrils have uniformly been dispersed and possesses a porosity proper as a porous film, a moisture-permeability based thereon as well as excellent tensile strength.

Tensile strength of the porous film of polypropylene obtained according to the present invention is at least 35 MPa, preferably at least 50 MPa, more preferably at least 70 MPa in machine and transverse directions, as calculated on the basis of actual sectional area of the film.

Porosity of the film thus obtained is not more than 80%, preferably not more than 60%, more preferably not more than 50% and especially preferably within the range from 10% to 50% by properly selecting the thermal treating and the stretching conditions of the starting film from the aforesaid ranges.

Moisture-permeability of the porous film of the present invention is preferably at least 20 g/m² day, preferably at least 40 g/m² day. In the stretching and thermal treatment of the film according to the present invention, any changes in the intrinsic viscosity [η] is within the range of measurement errors and is thus small.

The aforesaid characteristics in the present invention were measured according to the following methods:
(Thickness of Film)

Thickness of the film was measured by the aid of a film-thickness measuring apparatus named Miniax (Model DH-150) made by Tokyo Seimitsu KK.
(Porosity)

A film sample was weighed and the thickness as a dense film was determined by calculation, deeming density of the film as 0.91 g/cc. Porosity was determined, using the following equation, in relation with the value determined by the aforesaid film-thickness measuring apparatus:

$$\text{Porosity (vol. \%)} = \frac{T_0 - T_w}{T_0} \times 100$$

wherein $T_0$ stands for thickness of the actual film measured by the film-thickness measuring apparatus, and $T_w$ for thickness of a dense film of 0% in porosity determined by calculation from the weight.
(Tensile Strength) and (Fracture Point Elongation)

These factors were measured and calculated at room temperature (23° C.) by the aid of a tensile strength tester named Tensilon (Model RTM 100) made by Orientec Sha in accordance with ASTM D882, Method A (width of test samples: 15 mm).

(Moisture Permeability) and (Moisture Permeability Coefficient)

Calcium chloride was placed in a moisture permeable cup and tightly sealed with a test sample. The calcium chloride became hygroscopic through the test sample and changed its weight. The changed weight was measured by a precision balance and the moisture permeability was calculated according to the following equation:

$$\text{Moisture permeability (g/m}^2 \cdot \text{day)} = \frac{P}{Q}$$

wherein P stands for a changed weight of the test sample per day in terms of g and Q for a moisture permeable area of the test sample in terms of m².

The moisture permeability coefficient was calculated according to the following equation:

$$\text{Moisture permeability coefficient (g·mm/m}^2\cdot\text{day)} = X \times Y \text{ (mm)}$$

wherein X stands for the value of the moisture permeability calculated above and Y for a thickness of the test sample.

By the way, the test was carried out under the following conditions: temperature 40° C. and humidity 90%, and a cylindrical cap of 60 mm in diameter was used as the cap.
(Air Permeability)

Air permeability of the film was measured according to ASTM D726 by the aid of a standard Gurley Densometer (Toyo Seiki Seisakusho: Gurley Densometer Type B) for measuring Gurley seconds.
(Crystallinity)

Crystallinity referred to in the present invention was determined by calculation as a ratio of a heat of fusion to a theoretical heat of crystal fusion, the heat of fusion being simultaneously measured at the time of measuring the melting point according to ASTM D3417 with the aid of a differential scanning calorimeter (DSC).

EXAMPLES

The present invention will now be illustrated in more detailed by way of Examples, but it is construed that these Examples are given only for explanation of preferable embodiments of the invention and that the invention is not limited to to these Examples unless it oversteps the scope as defined in the claims.

Experimental Example 1

A biaxially stretched film of polypropylene [made by Tocello Brand(OP U-O) No. 20, intrinsic viscosity 2.9 dl/g (measured according to ASTM D4020)] was used as a precursor film.

Table 1 shows a result of measurement made for the physical properties of the film used.

TABLE 1

| Exp. No. | Thickness (μm) | Tensile strength (MPa) | | Elongation (%) | | Crystallinity (%) | Moisture Permeability (g/m².day) | Moisture P. C* (gmm/m².day) |
|---|---|---|---|---|---|---|---|---|
| | | MD | TD | MD | TD | | | |
| 1 | 19.9 | 141 | 291 | 179 | 31 | 50.3 | 11.5 | 0.23 |

(Remarks)
MD: Machine direction
TD: Transverse direction
*P.C.: permeability coefficient Experimental Examples 2–11
(Making Porous by the Thermal Treatment)

Using the film of Experimental Example 1, a thermal treatment was carried out in the following manner: As is evident from FIG. 1, the precursor film (12) was held between a pair of metal frames (13) made of a stainless steel and fixed in all directions by fixing the up-and-down frames with a screw (1). The precursor film in such state was immersed into a tank filled with a treating medium and allowed to stand for a given period of time. The film fixed with the metal frame was dipped as such into a vessel filled with hexane kept at room temperature (23° C.) and allowed to stand for 10 minutes to replace the treating medium therewith. The metal frame was then taken up from the hexane and air dried at room temperature (23° C.). The film was then taken out of the metal frame and used as a test sample for measurement. Tables 2 and 3 show the treating conditions and results thereof.

In Experimental Examples 5 and 9, the treating temperature was so excessively high that the polypropylene was dissolved.

In Experimental Examples 10 and 11 wherein a silicone oil was used as the treating medium, moisture permeability of the film was not satisfactory only by immersion into the solvent.

Experimental Examples 12–15

(Stretching to Make the Film Porous)

The film obtained in Experimental Example 1 was subjected to a definite width uniaxial stretching or a sequential biaxial stretching under the conditions as shown in Table 4 in the presence of a silicone oil (Toshiba Silicone KK, Brand: TSF451-200) by the aid of a tenter-clip type biaxial stretcher to render the film porous. The stretching operation was initiated one minute after the film was charged into a stretching tank maintained at a predetermined temperature. A stretching rate was constant whereby the initial rate was 500%/min. in distortion rate for the length of the test sample.

Table 4 shows the stretching conditions for the film while Table 5 shows the characteristics of the stretched film.

TABLE 2

| Exp. No. | Treating medium | Treating temp. (°C.) | Treating time (min.) |
|---|---|---|---|
| 2 | liquid paraffin * | 140 | 1 |
| 3 | liquid paraffin * | 152 | 1 |
| 4 | liquid paraffin * | 154 | 1 |
| 5 | liquid paraffin * | 156 | 1 |
| 6 | liquid paraffin | 152 | 5 |
| 7 | n-decane | 120 | 1 |
| 8 | n-decane | 132 | 1 |
| 9 | n-decane | 140 | 1 |
| 10 | silicone oil ** | 160 | 1 |
| 11 | silicone oil ** | 168 | 1 |

(Remarks) * made by Witco: Carnation (viscosity index: cSt/40° C. = 11–14)
** made by Toshiba Silicone KK, Silicone oil TSF451-200

TABLE 4

| | Stretching temp. | Stretch ratio | |
|---|---|---|---|
| Exp. No. | (°C.) | MD | TD |
| 12 | 160 | 1.5 | 1.0 |
| 13 | 160 | 2.0 | 1.0 |
| 14 | 168 | 1.5 | 1.0 |
| 15 | 160 | 1.2 | 1.2 |

(Remarks) MD: Machine direction, TD: Transverse direction

TABLE 3

| Exp. No. | State of film | Thickness (μm) | Porosity (%) | T. S. (MPa) MD | T. S. (MPa) TD | Elongation (%) MD | Elongation (%) TD | Air permeability (sec/10 ml) | Moisture permeability (g/m².day) | Crystallinity (%) |
|---|---|---|---|---|---|---|---|---|---|---|
| 2 | Slightly blue white | 22.1 | 2.3 | 133 | 292 | 224 | 37 | * | 27 | 52.9 |
| 3 | Blue white | 24.6 | 18.5 | 118 | 241 | 270 | 43 | 892 | 108 | 55.9 |
| 4 | White | 23.1 | 21.5 | 95 | 152 | 254 | 26 | 417 | 367 | 55.6 |
| 5 | Dissolved | — | — | — | — | — | — | — | — | — |
| 6 | Blue white | 25.2 | 18.5 | 115 | 233 | 265 | 41 | 1472 | 85 | 55.8 |
| 7 | Slightly blue white | 22.8 | 4.8 | 130 | 296 | 223 | * | 40 | 42 | 54.7 |
| 8 | Blue white | 25.0 | 13.9 | 107 | 221 | 243 | 48 | 1054 | 61 | 55.8 |
| 9 | Dissolved | — | — | — | — | — | — | — | — | — |
| 10 | Transparent | 20.0 | — | 133 | 290 | 165 | 35 | * | 13 | 53.5 |
| 11 | Transparent | 20.1 | — | 135 | 285 | 160 | 32 | * | 15 | 53.7 |

(Remarks)
T.S.: Tensile strength, MD: Machine direction, TD: Transverse direction,
*at least 2000 sec./10 ml

TABLE 5

| Exp. No. | State of film | Thickness (μm) | Porosity (%) | T. S. (MPa) MD | T. S. (MPa) TD | Elongation (%) MD | Elongation (%) TD | Air permeability (sec/10 ml) | Moisture permeability (g/m².day) | Crystallinity (%) |
|---|---|---|---|---|---|---|---|---|---|---|
| 12 | Blue white | 17.8 | 20.8 | 167 | 218 | 91 | 36 | 57 | 2460 | 52.1 |
| 13 | Blue white | 16.5 | 32.2 | 148 | 144 | 41 | 30 | 17 | 6530 | 53.3 |
| 14 | White | 17.4 | 24.8 | 167 | 174 | 92 | 25 | 32 | 3250 | 54.7 |
| 15 | Blue white | 19.5 | 30.1 | 123 | 159 | 63 | 39 | 21 | 5320 | 52.8 |

(Remarks)
T.S.: Tensile strength, MD: Machine direction, TD: Transverse direction

Experimental Example 16
(Thermal Treatment followed by Stretching to make the Film Porous)

A thermal treatment was carried out in the same manner as described in Experiment No. 8 in n-decane as treating medium. Prior to dipping into hexane, a fixed width uniaxial stretching treatment was carried out in N-decane maintained at the same temperature (132° C.) as the treating temperature. The stretching treatment was carried out in the same manner as in the case of Experimental Examples 12–15 whereby the stretch rate was 2 times as much as in machine direction.

Table 6 shows the characteristics of the stretched film.

The inflation film was subjected to a thermal treatment for 3 minute in an air oven maintained at 160° C. and then subjected to a fixed width uniaxially stretching treatment or a sequential biaxial stretching treatment in a silicone oil (made by Toshiba Silicone KK, TSF-451-200). As the stretching treatment could not be carried out uniformly at a higher temperature, it was carried out under a relatively low temperature condition. The stretching treatment was initiated one minute after the film was dipped into a stretching tank regulated at a predetermined temperature. A stretching rate was constant whereby the initial rate was 500%/min. in distortion rate for the length of the test sample.

TABLE 6

| Exp. No. | State of film | Thickness ($\mu$m) | Porosity (%) | T. S. (MPa) MD | T. S. (MPa) TD | Elongation (%) MD | Elongation (%) TD | Air permeability (sec/10 ml) | Moisture permeability (g/m$^2$.day) | Crystallinity (%) |
|---|---|---|---|---|---|---|---|---|---|---|
| 16 | Blue white | 23.5 | 35.0 | 141 | 137 | 42 | 31 | 14 | 7230 | 54.3 |

(Remarks)
T. S.: Tensile strength, MD: Machine direction, TD: Transverse direction

Experimental Example 17–19

Using a conventional inflation film apparatus (made by Thermoplastics, Extruder: 30 mm$\phi$, L/D=25, Take-up machine: Model 4–18), a film was prepared under the following conditions:

Using polypropylene (made by Mitsui Petrochemical Industries, Ltd. Brand name: B200, MFR=0.5 g/10 min., intrinsic viscosity: 3.5 dl/g) as starting material, an inflation film having a folded width of 200 mm was prepared by adjusting the predetermine temperatures of the extruder, adapter and die portions to 230° C., 230° C. and 230° C., respectively, a ratio of the film take-up velocity to the resin extrusion velocity at the die portion (draft ratio) to 10, and an expansion ratio to 2. An intrinsic viscosity [$\eta$] of the resultant film was 3.3 dl/g. Table 7 shows the characteristics of the resultant film.

Table 8 shows the stretching conditions while Table 9 shows the characteristics of the stretched film.

TABLE 8

| Exp. No. | Stretching temp. (°C.) | Stretch ratio MD | Stretch ratio TD |
|---|---|---|---|
| 18 | 80 | 2.0 | 1.0 |
| 19 | 80 | 2.0 | 2.0 |

(Remarks) MD: Machine direction TD: Transverse direction

TABLE 7

| Exp. No. | Thickness ($\mu$m) | Tensile strength (MPa) MD | Tensile strength (MPa) TD | Elongation (%) MD | Elongation (%) TD | Crystallinity (%) | Moisture Permeability (g/m$^2$.day) | Moisture P. C* (gmm/m$^2$.day) |
|---|---|---|---|---|---|---|---|---|
| 17 | 62.0 | 67 | 63 | 947 | 950 | 46.5 | 10 | 0.62 |

(Remarks)
MD: Machine direction, TD: Transverse direction, and P. C.: permeability coefficient

TABLE 9

| Exp. No. | State of film | Thickness ($\mu$m) | Porosity (%) | T. S. (MPa) MD | T. S. (MPa) TD | Elongation (%) MD | Elongation (%) TD | Air permeability (sec/10 ml) | Moisture permeability (g/m$^2$.day) | Crystallinity (%) |
|---|---|---|---|---|---|---|---|---|---|---|
| 18 | Blue white | 45.1 | 48.1 | 103 | 38 | 970 | 130 | 27 | 4510 | 52.4 |
| 19 | Blue white | 42.1 | 54.3 | 52 | 51 | 430 | 600 | 10 | 8540 | 52.7 |

(Remarks)
MD: Machine direction TD: Transverse direction

Experimental Example 20

An inflation film was prepared in the same manner as described in Experimental Example 17 except that only the draft ratio was changed to 18. Table 10 shows the characteristics of the resultant film.

TABLE 10

| Exp. No. | Thickness of film (μm) | Tensile strength (MPa) MD | Tensile strength (MPa) TD | Elongation (%) MD | Elongation (%) TD | Crystallinity (%) |
|---|---|---|---|---|---|---|
| 20 | 34.7 | 76 | 6.0 | 720 | 780 | 44.9 |

(Remarks) MD: Machine direction TD: Transverse direction (Thermal Treatment for making the Film Porous and Thermal Treatment Followed by Stretching for making the Film Porous)

Using the film of Exp. No. 20, a thermal treatment was carried out in the same manner as illustrated in Experiment Examples 2–11. A part of the film subjected to the thermal treatment was further treated with a tenter-clip type biaxial stretcher to stretch the film biaxially. Tables 11 and 12 show the conditions for the thermal treatment and the optional stretching treatment and a result of the treatments, respectively.

TABLE 11

| Exp. No. | Treating medium | Treating temperature (°C.) | Treating time (min.) | Stretching treatment | Stretch rate MD | Stretch rate TD |
|---|---|---|---|---|---|---|
| 21 | Liquid paraffin | 140 | 1 | None | — | — |
| 22 | Liquid paraffin | 154 | 1 | Yes | 2 | 2 |

(Remarks) MD: Machine direction TD: Traverse direction

TABLE 12

| Exp. No. | State of film | Thickness (μm) | Porosity (%) | T. S. (MPa) MD | T. S. (MPa) TD | Elongation (%) MD | Elongation (%) TD | Air permeability (sec/10 ml) | Crystallinity (%) |
|---|---|---|---|---|---|---|---|---|---|
| 21 | White | 34.2 | 18.3 | 45 | 18 | 313 | 112 | 161.0 | 50.5 |
| 22 | White | 14.5 | 47.0 | 52 | 51 | 430 | 600 | 9.1 | 52.1 |

(Remarks)
T.S.: Tensile strength, MD: Machine direction, TD: Transverse direction It was found that a satisfactory strength was not achieved in Experiment Example 21 wherein only the thermal treatment was carried out. By the way, the moisture permeability of these film was recognized to be at least 20 g/m²·day in view of the values of air permeability.

(Effect of the Invention)

In accordance with the present invention, there is provided a porous film of polypropylene excellent in tensile strength which has been obtained by subjecting an air-impermeable polypropylene film obtained without substantial use of a plasticizer and a solvent to stretching and/or thermal treatment. This film is preferably utilizable for various fields of industry such as packaging materials for foods, filtering materials for precision filtration and separators for battery, especially as a film for printing use, a base film for adhesion, an air-permeable film and the like.

As many apparently widely different embodiments of the present invention may be made without departing from the spirit and scope thereof, it is to be construed that the present invention is not limited to the specific embodiments thereof except as defined in the appended claims.

What is claimed is:

1. A process for producing a porous film of polypropylene resin which comprises subjecting an air-impermeable biaxially stretched film of polypropylene resin comprised predominantly of polypropylene having a crystallinity of at least 40%, in the substantial absence of a plasticizer or a solvent, to a thermal treatment in the presence of a first liquid substantially incapable of dissolving the film while fixing the film in two orthogonal directions for making the film porous.

2. A process for producing a porous film of polypropylene resin which comprises subjecting an air-impermeable inflation film of polypropylene resin comprised predominantly of polypropylene having a crystallinity of at least 46.5%, in the substantial absence of a plasticizer or a solvent, to a thermal treatment in the presence of a first liquid substantially incapable of dissolving the film while fixing the film in two orthogonal directions for making the film porous.

3. The process for producing the porous film of polypropylene resin according to claim 1 or 2, wherein the first liquid is a hydrocarbon having a boiling point higher than the treating temperature during the thermal treatment for making the film porous.

4. The process for producing the porous film of polypropylene resin according to claim 1 or 2, wherein the thermal treatment is carried out in the presence of the first liquid substantially incapable of dissolving polypropylene, the polypropylene film is then dipped into a second liquid which is compatible with the first liquid but having a boiling point lower than the first liquid and having an affinity to polypropylene inferior to that of the first liquid, and thereafter the film is dried.

5. The process for producing the porous film of polypropylene resin according to claim 1 or 2, wherein the starting polypropylene has an intrinsic viscosity (η) of not more than 4 dl/g.

6. The process for producing the porous film of polypropylene resin according to claim 1 or 2 wherein the porous film possesses:
   (1) a tensile strength of at least 35 MPa in machine direction (MD) and transverse direction (TD);
   (2) a porosity of not more than 80%; and
   (3) a moisture permeability of at least 20 g/m² ·day.

* * * * *